(12) United States Patent
Mahyar et al.

(10) Patent No.: US 11,659,217 B1
(45) Date of Patent: May 23, 2023

(54) EVENT BASED AUDIO-VIDEO SYNC DETECTION

(71) Applicant: Amazon Technologies, Inc., Seattle, WA (US)

(72) Inventors: Hooman Mahyar, Seattle, WA (US); Avijit Vajpayee, West Windsor, NJ (US); Abhinav Jain, Atlanta, GA (US); Arjun Cholkar, Bothell, WA (US); Vimal Bhat, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 17/301,212

(22) Filed: Mar. 29, 2021

(51) Int. Cl.
*H04N 21/242* (2011.01)
*H04N 21/234* (2011.01)
*H04N 21/233* (2011.01)

(52) U.S. Cl.
CPC ......... *H04N 21/242* (2013.01); *H04N 21/233* (2013.01); *H04N 21/234* (2013.01)

(58) Field of Classification Search
None
See application file for complete search history.

(56) References Cited

U.S. PATENT DOCUMENTS

| | | | |
|---|---|---|---|
| 5,844,600 A | 12/1998 | Kerr | |
| 6,480,902 B1 | 11/2002 | Yuang et al. | |
| 7,692,724 B2 | 4/2010 | Arora et al. | |
| 8,358,375 B2* | 1/2013 | Ikeda | H04N 21/8106 348/515 |
| 8,363,161 B2 | 1/2013 | Pearlstein | |
| 8,400,566 B2 | 3/2013 | Terry et al. | |
| 9,565,426 B2 | 2/2017 | Yang et al. | |
| 9,602,858 B1 | 3/2017 | Kaiser et al. | |
| 10,158,927 B1 | 12/2018 | Lei et al. | |
| 10,354,354 B2 | 7/2019 | Zhao et al. | |
| 10,497,382 B2* | 12/2019 | Chaudhuri | H04N 21/44008 |
| 11,308,963 B2* | 4/2022 | Kim | G10L 15/22 |
| 11,336,935 B1 | 5/2022 | Wu et al. | |
| 2004/0227856 A1* | 11/2004 | Cooper | G06V 40/20 348/461 |
| 2006/0146185 A1 | 7/2006 | Chen | |
| 2007/0092224 A1* | 4/2007 | Tsukagoshi | H04N 5/602 348/E5.009 |
| 2007/0153089 A1* | 7/2007 | Cooper | H04N 21/2368 375/E7.271 |
| 2007/0276670 A1 | 11/2007 | Pearlstein | |
| 2008/0263612 A1 | 10/2008 | Cooper | |

(Continued)

OTHER PUBLICATIONS

Relative Timing of Sound and Vision for Broadcasting, ITU, 1998 (https://www.itu.int/dms_pubrec/itu-r/rec/bt/RREC-BT.1359-1-199811-I!!PDF-E.pdf).

(Continued)

*Primary Examiner* — William J Kim
(74) *Attorney, Agent, or Firm* — Weaver Austin Villeneuve & Sampson LLP (57) ABSTRACT

Techniques are described for detecting desynchronization between an audio component and a video component of a media presentation. Feature sets may be determined for portions of the audio component and portions of the video component, which may then be used to generate correlations between portions of the audio component and portions of the video component. Synchronization may then be assessed based on the correlations.

17 Claims, 6 Drawing Sheets

(56) References Cited

U.S. PATENT DOCUMENTS

| | | | | |
|---|---|---|---|---|
| 2010/0053340 | A1* | 3/2010 | Ikeda | H04N 21/43072 |
| | | | | 348/E17.003 |
| 2011/0230987 | A1* | 9/2011 | Anguera Miro | G11B 27/031 |
| | | | | 700/94 |
| 2013/0089303 | A1* | 4/2013 | Jiang | H04N 21/233 |
| | | | | 386/285 |
| 2013/0089304 | A1* | 4/2013 | Jiang | G06V 20/41 |
| | | | | 386/285 |
| 2014/0315610 | A1 | 10/2014 | Shachar et al. | |
| 2015/0324636 | A1 | 11/2015 | Bentley et al. | |
| 2016/0165227 | A1* | 6/2016 | Babbar | H04L 43/50 |
| | | | | 348/181 |
| 2016/0322078 | A1 | 11/2016 | Bose et al. | |
| 2017/0061966 | A1* | 3/2017 | Marcheret | G10L 21/02 |
| 2017/0238055 | A1 | 8/2017 | Chang et al. | |
| 2019/0132372 | A1 | 5/2019 | Litsyn et al. | |
| 2019/0238952 | A1* | 8/2019 | Boskovich | G06F 16/433 |
| 2020/0357401 | A1* | 11/2020 | Kim | G10L 15/25 |
| 2021/0035599 | A1* | 2/2021 | Zhang | G10L 25/30 |
| 2021/0142066 | A1 | 5/2021 | Jayaram et al. | |
| 2022/0058850 | A1* | 2/2022 | Agarwal | G06V 10/40 |

OTHER PUBLICATIONS

Owens et al., "Audio-visual scene analysis with self-supervised multisensory features." Proceedings of the European Conference on Computer Vision (ECCV). 2018.

Khosravan et al., "On Attention Modules for Audio-Visual Synchronization." CVPR Workshops. 2019.

Korbar et al., "Cooperative Learning of Audio and Video Models from Self-Supervised Synchronization" In the Proceedings of 32nd Conference on Neural Information Processing Systems, Montréal, Canada, 2018.

Tran et al., "Learning Spatiotemporal Features with 3D Convolutional Networks", arXiv:1412.0767.

Choi et al., "Why Can't I Dance in the Mall? Learning to Mitigate Scene Bias in Action Recognition," https://arxiv.org/abs/1412.0767.

Chung et al., "Out of time: automated lip sync in the wild", In ACCV Workshop on Multi-view Lip-reading, ACCV, 2016.

Tran et al., "A closer look at spatiotemporal convolutions for action recognition." Proceedings of the IEEE conference on Computer Vision and Pattern Recognition. 2018.

Chung et al., "Voxceleb2: Deep speaker recognition." *arXiv preprint arXiv*:1806.05622 (2018).

Xiao et al., "Audiovisual SlowFast Networks for Video Recognition." Facebook AI Research (FAIR), (2020).

Chung et al., "Perfect Match: Improved Cross-Modal Embeddings For Audio-Visual Synchronisation,"(2019).

U.S. Appl. No. 17/247,065, filed Nov. 25, 2020, Wu et al.

U.S. Notice of Allowance dated Jan. 14, 2022 issued in U.S. Appl. No. 17/247,065.

U.S. Office Action dated Aug. 25, 2021 issued in U.S. Appl. No. 17/247,065.

* cited by examiner

EVENT BASED AUDIO-VIDEO SYNC DETECTION

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

A recurring challenge in providing media content to consumers is maintaining synchronization between an audio stream and a video stream, as consumers may be dissatisfied if an audio stream excessively leads or lags its associated video stream. Thus, it would be desirable to provide techniques for identifying audio-visual desynchronization and for synchronizing audio content and video content.

DETAILED DESCRIPTION

This disclosure describes techniques for identifying audio-visual desynchronization and for synchronizing audio content and video content. A media content provider providing a given media presentation may want to check whether the audio and video components of the presentation are synchronized. Various machine learning models and related techniques are described that are capable of identifying correlations between portions of the audio and video components of a media presentation. Based on such correlations, desynchronization of the audio and video components can be identified and corrected. According to a particular class of implementations, the correlations are determined between the individual frames of the video component and portions of the audio component (referred to herein as "bins") that correspond to the video frames relative to their common media timeline.

In some implementations, a machine learning model is used to generate a set of confidence scores for a video frame and multiple audio bins near that video frame on the media timeline (or vice versa). The confidence scores are indicative of the strength of the correlation between each audio bin and the video frame. Based on these confidence scores, the video component or the audio component may be altered to improve synchronization. An example may be instructive.

Figure 1:
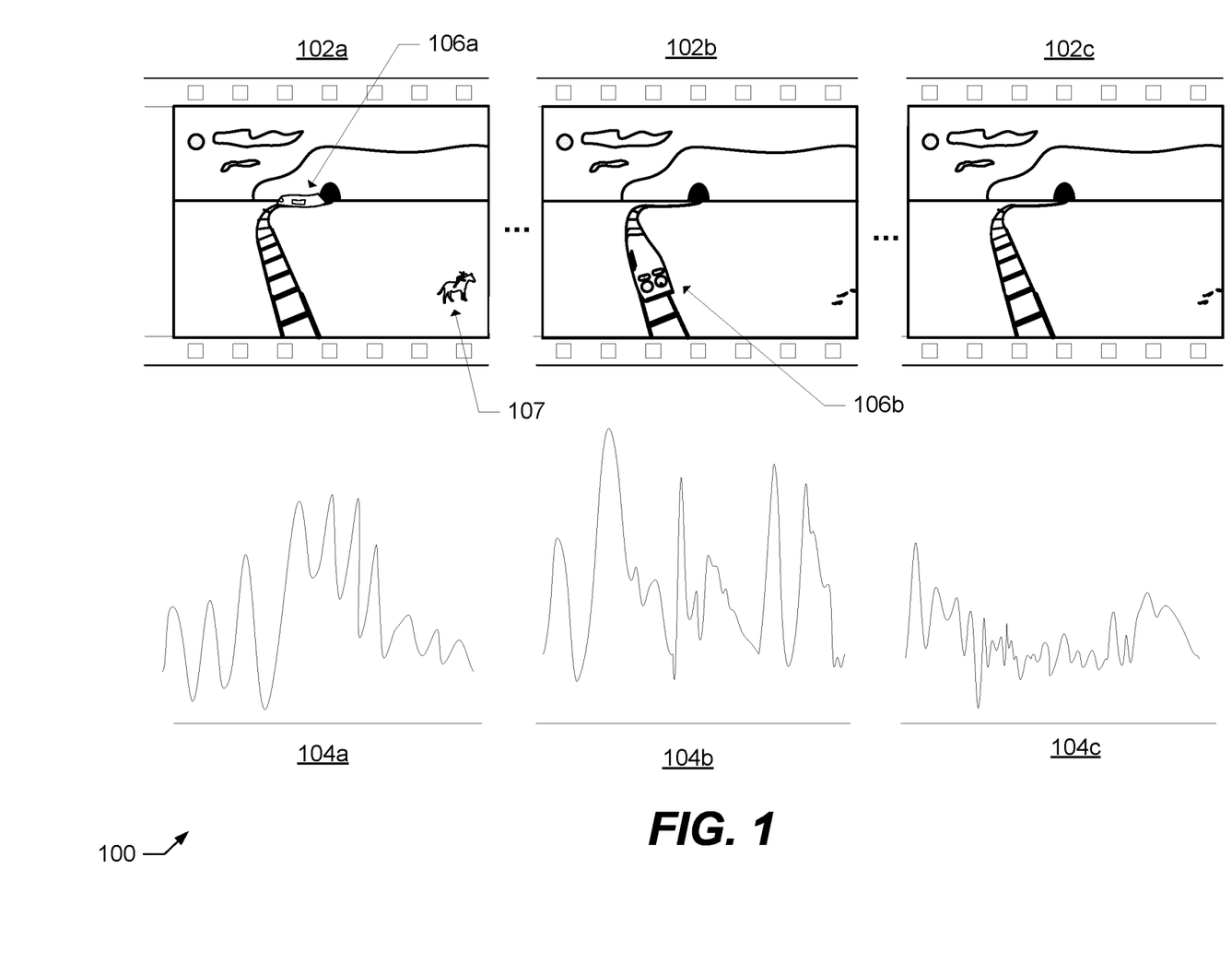
FIG. 1 illustrates an example of identifying correlations between audio and video content.

FIG. 1 illustrates an example of identifying correlations between portions of the audio component and video component of a media presentation. A media presentation 100 has frames 102a-c and corresponding audio bins 104a-c. Frames 102a-c are part of a video component of the media presentation 100. Frames 102a-c may have various objects within each video frame. For example, in frame 102a there is a horse 107 in the foreground of the frame and a train 106a in the background of the frame (relative to the horse 107). In frame 102b the horse 107 is absent from the video frame, and the train 106a has moved to the foreground of the image frame as train 106b. In frame 102c the horse and train are absent.

Audio bins 104a-c may correspond with frames 102a-c, respectively. Each audio bin represents a portion of the audio component of the media presentation during the corresponding frame and includes sounds that correlate with objects in the corresponding frame. For example, one of audio bins 104a-c may include sounds indicative of a horse galloping and a train moving along a railroad track, while another audio bin has sounds indicative of a train that are louder but lack sounds indicative of a horse.

To determine whether the video frames and audio bins are synchronized, correlations are determined between pairs of video frames 102a-c and audio bins 104a-c. Correlations may be determined using feature sets generated for each audio bin and video frame. Video feature sets are generated for each of frames 102a-c. For example, the video feature sets might include an object vector that represents objects in the frame such as horse 107 or train 106a-b. The video feature sets might also include an object attribute vector that represents attributes of the objects in the frame, e.g., size, position, location, type, etc.

Audio feature sets are also generated for each of audio bins 104a-c. For example, the audio feature sets might include an audio vector which include features representing a Fourier transform of the audio that indicate the amplitude or energy of discrete frequencies in the audio bin. The audio vector may indicate sounds associated with the audio bin, such as a horse galloping or a train moving along a railroad track.

A machine learning model may then be applied to pairs of video feature sets and audio feature sets to determine a confidence score between a frame and an audio bin. For example, the object vector and object attribute vector for frame 102b and the audio vector for audio bin 104b are provided as inputs to a machine learning model that outputs a confidence score that the frame 102b and audio bin 104b are synchronized. Confidence scores may also be determined between frame 102b and audio bin 104a and audio bin 104c, as well as between frame 102a and each of audio bins 104a-c and frame 102c and each of audio bins 104a-c.

The confidence scores are used to determine whether frames 102a-c are desynchronized with audio bins 104a-c. For example, the confidence score between frame 102b and audio bin 104a may be higher than the confidence score between frame 102b and audio bin 104b. Similarly, the confidence score between frame 102c and audio bin 104b may be higher than the confidence score between frame 102c and audio bin 104c. Based on this, the audio component and the video component of media presentation 100 are determined to be desynchronized.

The audio component and video component may be synchronized by various methods. For media presentation 100, frames 102a-c and audio bins 104a-c may be shifted such that frame 102b and audio bin 104a as well as frame 102c and audio bin 104b correspond to each other relative to their common media timeline. The shift may be performed for all of frames 102a-c and audio bins 104a-c. In some implementations, frames 102a-c are part of a single shot or a single scene, and the shift may be performed for all frames within the shot or scene.

It should be understood that frames 102a-c are used for illustrative purposes and that the differences between sequential frames of a media presentation are typically fewer. Video components of media presentations typically have multiple frames per second, e.g., 24, 30, or 60 frames per second. The differences between sequential frames, particularly sequential frames corresponding to a single shot or a scene, may be less significant than the differences discussed above between frames 102a-c.

Figure 2:
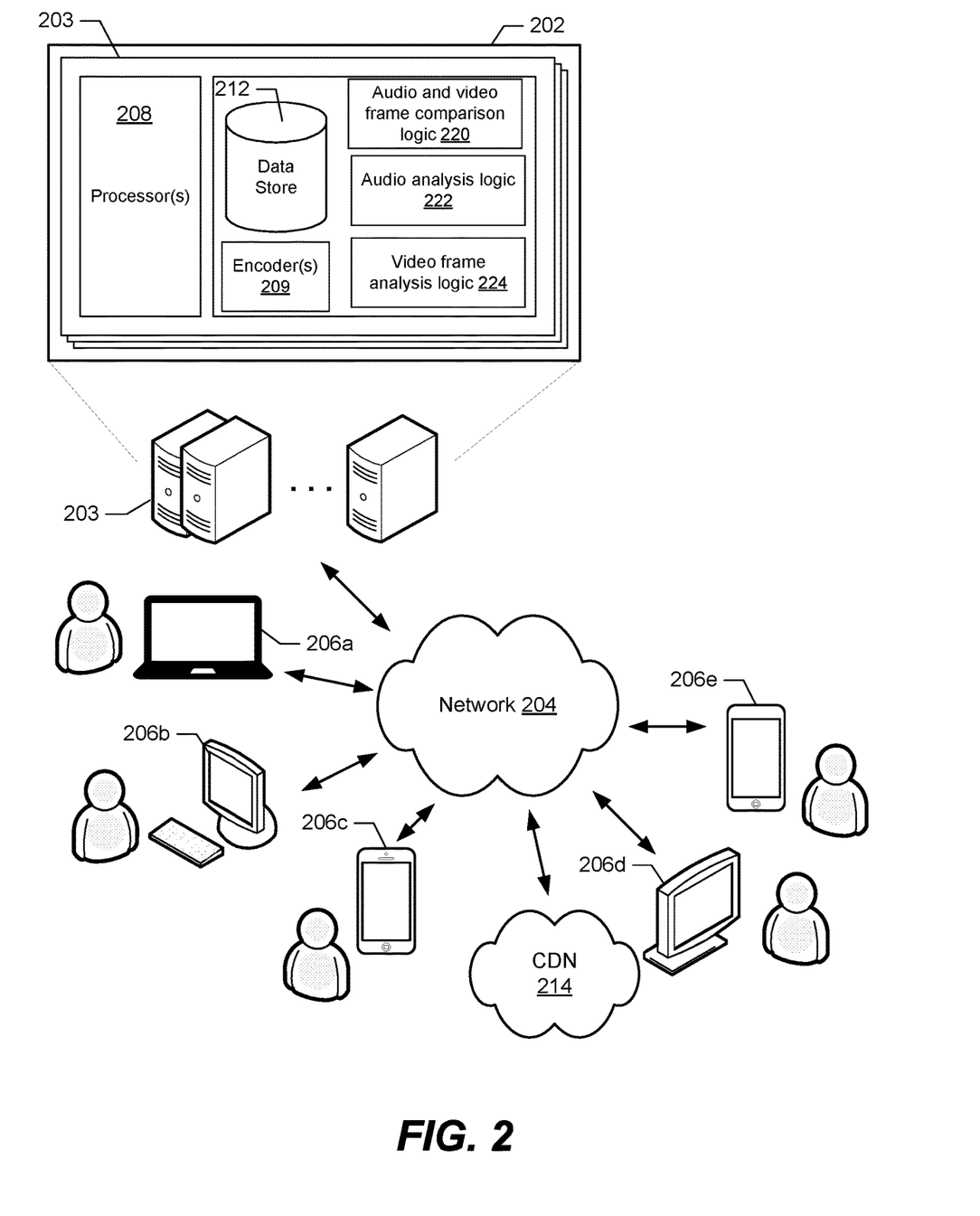
FIG. 2 presents a simplified diagram of a computing environment in which various implementations may be practiced.

FIG. 2 illustrates an example of a computing environment in which a video content service 202 provides live streaming content and video-on-demand (VOD) content (e.g., audio or video) via network 204 to a variety of client devices (206a-e) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, HTTP networks, TCP/IP-based networks, telecommunications networks, wireless networks, satellite networks, cable networks, public networks, private networks, wide area networks, local area networks, the Internet, the World Wide Web, intranets, extranets, etc.

Client devices 206a-e may be any suitable device capable of connecting to network 204 for streaming on-demand and live streaming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

Server 203 includes one or more processors 208, one or more encoders 209, one or more data stores 212, and other hardware and/or software components to encode media content and provide the encoded media content to client devices 206a-e. Server 203 may be implemented by a variety of physical servers and/or virtual servers. In some implementations, server 203 is partitioned to have several virtual servers configured to perform different functions. In one example, one virtual server searches for and identifies audio events, while a second virtual server searches for and identifies video events. Server 203 includes logic configured to detect desynchronization between audio and visual streams. Audio analysis logic 222 may be used to analyze portions of an audio component of a media presentation, including generating audio feature sets or predicting video feature sets based on portions of the audio component. Video frame analysis logic 224 may be used to analyze video frames of a video component of a media presentation, including generating video feature sets or predicting audio feature sets based on video frames. Audio and video frame comparison logic 220 may be used to compare audio feature sets and video feature sets to determine correlations and whether the audio component and video component of a media presentation are desynchronized. In some implementations, one or more of logics 222, 224, and 220 may employ a trained machine learning model.

Encoder 209 encodes media content that it receives from content providers such as, for example, content service 202, a third party content provider, an advertisement exchange server, etc. Encoding parameters and/or profiles are used to encode and package fragments of media content at various bitrates. Content may be encoded using a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.). For example, client device 206a might receive fragments encoded at a bitrate of 3,200 kbps, and client device 206b might receive fragments encoded at a bitrate of 2,400 kbps. And depending on their network conditions might both begin to receive fragments at a bitrate of 3,200 kbps. After an encoding process, encoded fragments are stored in memory such as a local buffer for delivery to CDN 214 or to client devices 206a-e.

In addition to providing access to media content, server 203 may also provide a variety of information related to the media content (e.g., various types of metadata and manifest data in data store 212 to which service 202 provides access). Alternatively, such information about the media content, as well as the media content itself may be provided and/or hosted by one or more separate platforms or databases, e.g., CDN 214. CDN 214 may help facilitate distribution of media content through a variety of software, hardware, and network components to client devices according to, for example, geographic proximity. It should be noted that while audio and video frame comparison logic 220, audio analysis logic 222, video frame analysis logic 224, and data store 212 are contemplated as integrated with server 203 of content service 202, implementations are also contemplated in which either or both operate remotely from the associated content service, and/or either or both are under the control of an independent entity. From these examples, those of skill in the art will understand the diversity of use cases to which the techniques described herein are applicable.

Client devices 206a-e can also include various types of logic, for instance, decoder logic for decoding the encoded media content received from edge server 204a and playback handling logic to request playback of portions of media content. In addition, client devices 206a-e includes various types of memory to store and/or cache decoded media, one or more processors, and other hardware components to request and decode the encoded media content provided by server 203. For example, the processors of client devices 206a-e execute stored instructions in memory to implement decoding and content retrieval techniques to acquire and play back content provided in accordance with the techniques disclosed herein. In addition, client devices 206a-e may communicate with server 203 through different types of network protocols such as a stateful connection, e.g., a physical socket connection between server and client, or using a stateless connection, for instance, using the Hypertext Transfer Protocol (HTTP).

Figure 3:
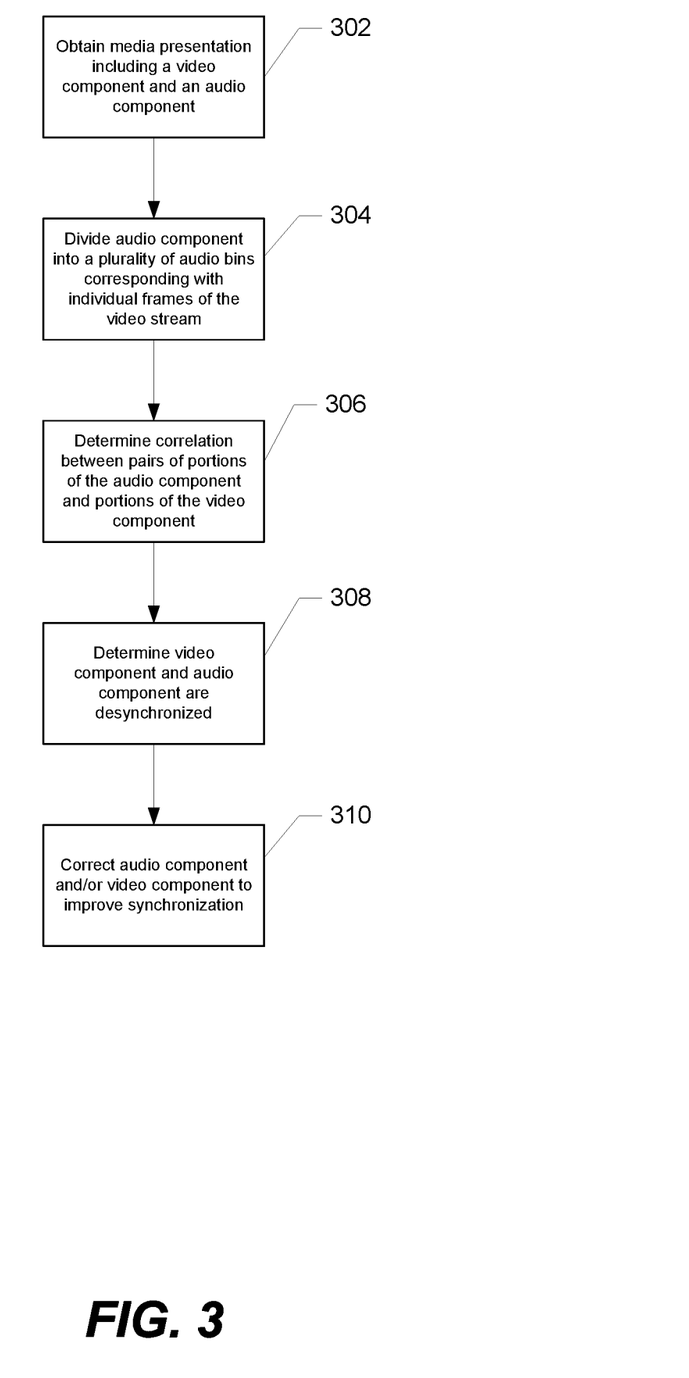
FIG. 3 presents a flowchart illustrating operations of an example implementation.

FIG. 3 presents a flowchart for detecting desynchronization between the video component and audio component of a media presentation. The flow of FIG. 1 may be performed at various times during the production or delivery of the content (e.g., during a livestream, upon obtaining new recorded and/or encoded content, during or after post-processing, upon receiving a playback request for a piece of content, as a scheduled maintenance task, etc.) As an example, the flow of FIG. 1 may involve obtaining a media presentation of video-on-demand (VOD) content and detecting if the audio and video components are desynchronized prior to publication of the VOD content to an online content library.

A media presentation is obtained that includes content having a video component and an audio component (302). The audio component is divided into audio bins, where each audio bin substantially corresponds to a frame of the video component based on the shared media timeline (304). For example, if the video component is configured for playback at 30 frames per second, each audio bin may include about 33 milliseconds of audio. In some implementations, the audio component is divided into bins having a whole number of audio frames as defined, for example, by the media presentation file format, e.g., the MP4 or CMAF media formats. In some implementations, the audio component is divided into bins having a whole number of audio samples as determined, for example, by the sampling rate with which the audio component is generated, e.g., 44.1 kHz, 48 kHz, 96 kHz, etc.. Other audio frame types and sampling rates may be used and are within the scope of this disclosure. In some implementations the correspondence between audio bins and video frames may be determined, for example, based on time stamps or indices.

Correlations between various pairs of portions of the audio component and portions of the video component are determined (306). Correlation may be represented by, for example, confidence scores that represent the degree to which a particular portion of the audio component and a particular portion of the video component are correlated. A low correlation between an audio portion and a video portion with which it is aligned on the media timeline may indicate that the audio and video components are desynchronized. Conversely, a high correlation between a corresponding audio bin and video frame may indicate that the audio and video components are well synchronized.

In some implementations, portions of the audio component may represent an individual audio bin or multiple audio bins. Similarly, portions of the video component may represent a single video frame or multiple video frames. In some implementation, portions of the audio component and portions of the video component may represent a continuous sequence of audio bins and video frames. In some implementation, portions of the audio component and portions of the video component may represent a non-continuous sequence of audio bins and video frames, e.g., every Nth audio bin and video frame (where N is a whole number, e.g., 5, 10, 15, etc.), or each video frame that is an I-frame and corresponding audio bin in a sequence of audio bins/video frames. In some implementations, the portions of the audio component and/or the portions of the video component may overlap based on, e.g., a sliding window. For example, a first portion may represent a sequence of bins/video frames that are included in a second portion. While the present disclosure may discuss determining correlations between pairs of audio bins and video frames, it should be understood that the correlation may be between portions of the audio component and portions of the video component, where such portions may include one or more audio bins or video frames and/or represent only a selected subset of the audio or video components.

In some implementations, correlations are determined between feature sets that are generated from corresponding video frames or audio bins. An audio feature set may be generated by applying a machine learning model, such as a neural network or audio embedding, or by performing a Fourier transform of the samples in audio bin, where each feature is indicative of an amplitude or energy of a discrete frequency. A video feature set may be generated by applying a model, such as a transformer or image embedding model, to a video frame to detect objects and attributes of the objects in the video frame. In some implementations, the model may be a machine learning model, such as a neural network. For example, a video feature set may include an object feature set that describes objects in the video frame and an object attribute feature set that describes various attributes of the objects in the video frame, including various visual characteristics such as size, location, position, type, hue, color, luminosity, texture, etc. The feature sets may be used for determining correlations. In some implementations, the feature sets are provided to a trained model that determines a correlation between an audio feature set and a video feature set. In some implementations, the audio feature sets and video feature sets may be generated from a single audio bin and video frame, while in other implementations the audio feature sets and video feature sets may be generated from a portion of the audio component and a portion of the video component representing multiple audio bins and video frames, as noted above. In some implementations, audio and video feature sets may be generated for all of the portions of the audio and video components of the media presentation, or for only a selected subset of the portions of each.

In some implementations, the video feature sets generated for a video frame may be generated based on a decoded video frame. In some implementations, the video feature sets may be generated based on an encoded video frame. In some implementations, the video feature sets generated for a first video frame may also be generated based on a second video frame from which the first video frame's encoding depends. For example, some video frames may be P-frames, which rely on decoding of a prior frame in order to be decoded. This may be due to shared objects between the frames. Thus, a video feature set generated for a video frame that is a P-frame may be generated additionally based on the video frame from which the P-frame relies. Various other dependencies between frames are known in the art, including I-frames that do not reference another frame for decoding.

In some implementations, the video feature sets and audio feature sets are generated based on specific types of frames. For example, a shot or scene may be characterized by one or more characters talking. Feature sets may be generated from a portion of the audio component and a portion of the video component for the shot or scene based on the one or more talking characters (including features sets based on a single audio bin/video frame or multiple audio bins/video frames). For example, the audio feature set and the video feature set may be based on each fifth audio bin/video frame for a sequence of frames in a shot or scene.

Figure 5:
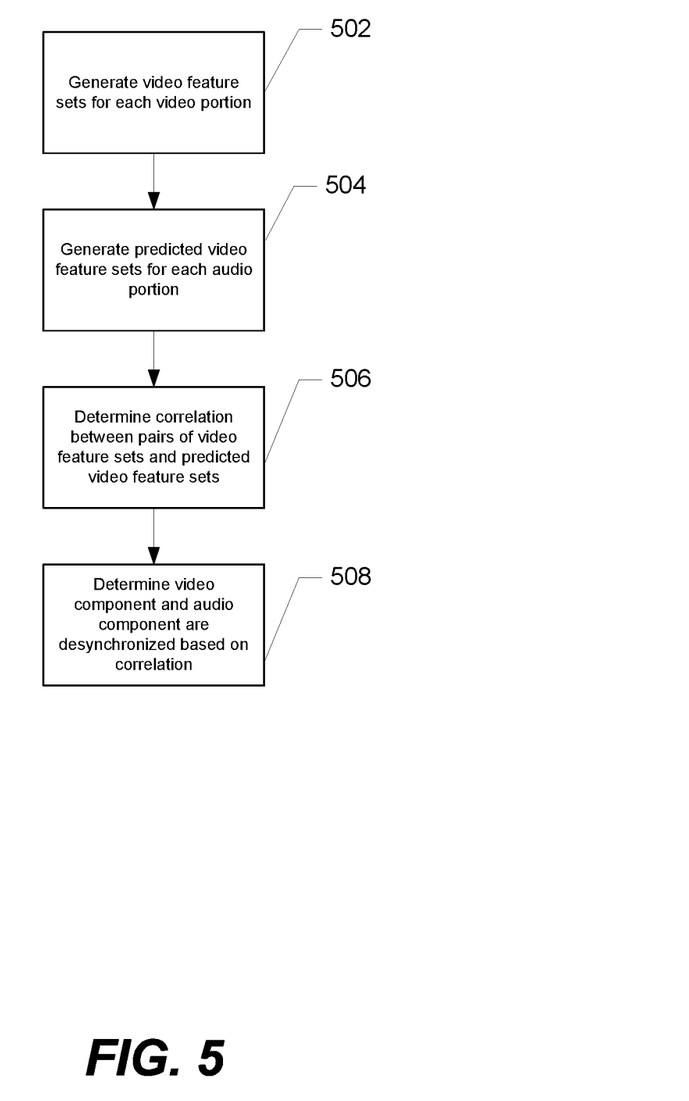
Figure 6:
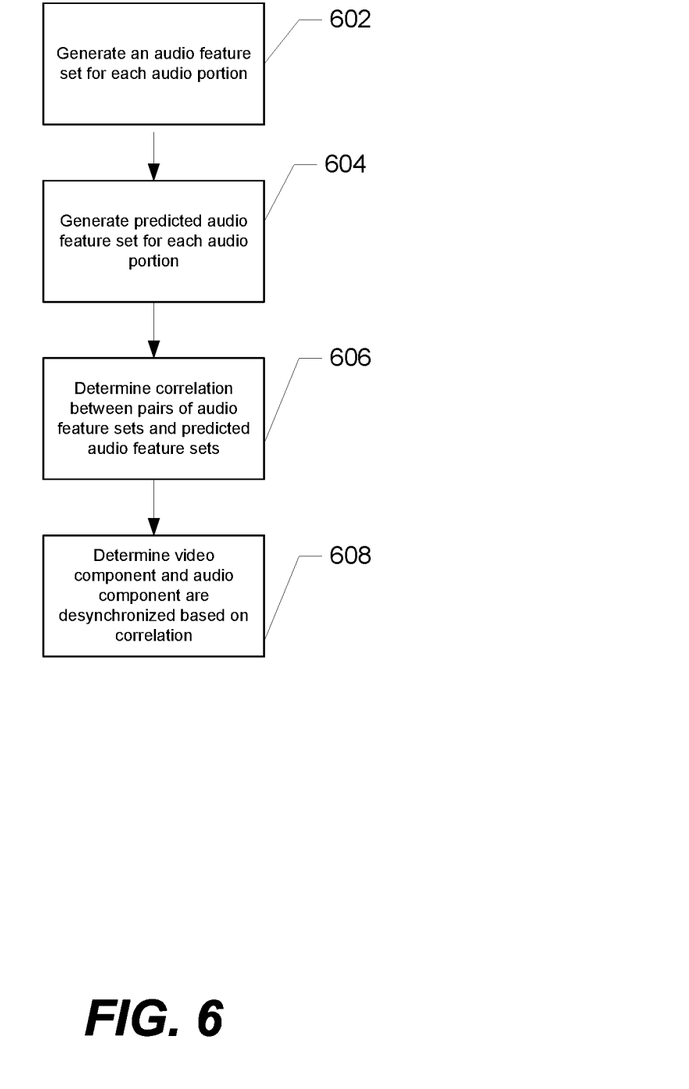

As discussed further below in relation to FIGS. 5 and 6, correlations may also be determined between feature sets generated from video frames compared to predicted feature sets generated from an audio bin (FIG. 5) and correlations may be determined from feature sets generated from audio bins compared to predicted feature sets generated from a video frame (FIG. 6). In some implementations, multiple correlations may be determined for an audio bin/video frame pair based on the various techniques discussed herein, e.g., FIGS. 5 and 6.

The video component and the audio component may be determined not to be synchronized based on the correlations (308). In some implementations, the correlations are provided as inputs to a model, such as a classifier. The classifier may be trained on correlations between video components and audio components of media presentations from a training data set. In some implementations the correlations may include correlations between each audio bin of a portion of the audio component and each video frame of a portion of the video component of a media presentation. The model may analyze the correlations to determine whether the audio component and the video component are synchronized. In some implementations the model may implement a threshold strategy, where an audio bin and a video frame sharing a media timeline are considered desynchronized if the correlation does not exceed a threshold value.

In some implementations, various pairs of audio bins and video frames are compared, e.g., one or more of the audio bins preceding and following a particular video frame on the media timeline, in addition to the audio bin that corresponds to that video frame. A preceding or following audio bin may have a higher correlation with the video frame, indicating that the audio and video components are desynchronized. This may also follow if, for example, multiple video frames each have a higher correlation with a non-corresponding audio bin, indicative of a consistent lag or lead between the audio and video components.

In some implementations, desynchronization is based on multiple correlations for the same audio bin/video frame pair. For example, as discussed above and in greater detail below in relation to FIGS. 4-6, correlations between a single audio bin/video frame pair may be determined using multiple techniques. In some implementations multiple correlations may be determined for the same audio bin/video frame pair, which may then be used to determine whether the audio component and video component are synchronized.

In some implementations a model, such as a classifier, is used to determine whether portions of the audio component and video component are desynchronized. The classifier may receive as inputs the correlations between audio portion/video portion pairs (including multiple correlations for a single audio portion/video portion pair). In some implementations, the classifier may determine that a portion of the audio component or the video component are desynchronized.

The audio and/or video component may be modified to improve synchronization (310). Synchronization may be improved in various ways. For example, either of the audio component or the video component may be modified such that higher correlating video frames and audio bins become corresponding relative to the shared timeline. In some implementations, audio bins and/or video frames may be stretched, compressed, or otherwise transformed to account for any modifications that are performed to improve synchronization. Alternatively, or in addition, new video frames and/or audio bins may be generated or existing video frames and/or audio bins may be removed. For example, as discussed further herein, audio bins may be analyzed to generate predicted video feature sets. The predicted video feature sets may be used to generate portions of a video frame. Similarly, video frames may be analyzed to generate predicted audio feature sets, which may be used to generate an audio bin. The generated video frame and/or audio bin may be inserted into the audio component or video component to improve synchronization. In some implementations, stretching and inserting video content or audio content may include duplicating video frames or audio bins.

In some implementations the modification to the audio component or the video component may be limited to a single shot or a single scene. This might be useful where, for example, video frames on either side of a shot or scene boundary may differ significantly from the video frames within a single shot or scene. Furthermore, post-production editing of a media presentation may result in transitions between different audio and/or video frames at shot or scene boundaries. Thus, desynchronization between the audio component and the video component may be limited to a shot or scene. In such implementations, the modification may similarly extend to the shot or scene, for example delaying or advancing all audio within a shot or scene by a fixed amount of time.

In some implementations, the modification may include modifying portions of the audio component or the video component that are not determined to be desynchronized. For example, in some implementations a sequence of frames may have highly similar visual content, e.g., a shot that slowly pans across a landscape. Given the similarity of visual content in each frame in the sequence, an audio bin may have similar correlations to each video frame, such that the sequence of video frames may not be determined to be desynchronized. However, one or more frames prior to or following the sequence of frames may be determined to be desynchronized. In such implementations, the audio component or video component may be modified to advance or delay audio for the one or more desynchronized frames as well as the sequence of frames that were not determined to be desynchronized. As the audio bins corresponding to the sequence of video frames may be highly correlated with each video frame in the sequence, shifting the audio bins may not cause desynchronization for the sequence of video frames, but will improve synchronization of the audio and video component preceding or following the sequence.

Figure 4:
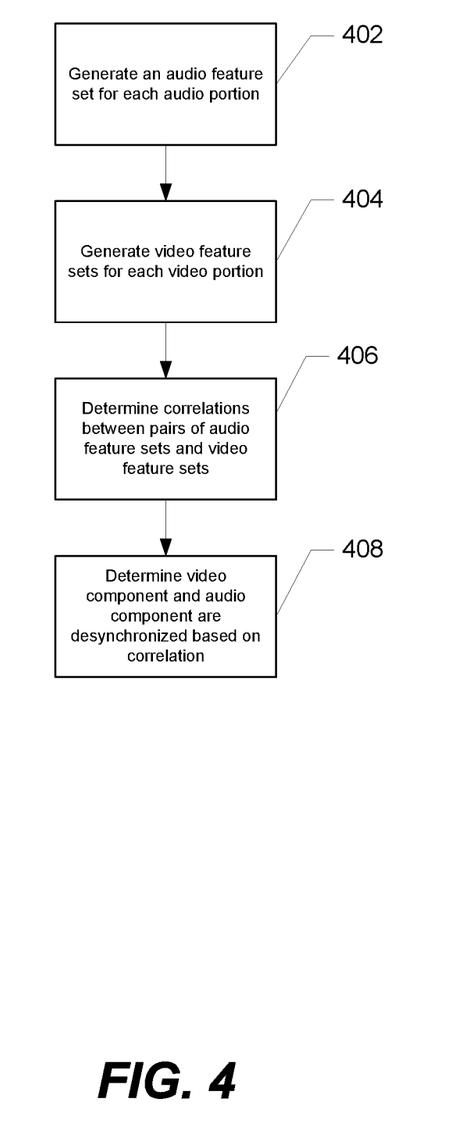
FIGS. 4, 5, and 6 present flowcharts illustrating operations for determining correlations between portions of an audio component and portions of a video component as described herein.

FIGS. 4-6 present flow diagrams for determining correlations between audio portions and video portions. FIG. 4 provides a flowchart for determining correlations based on feature sets generated from the audio bins and the video frames. Audio feature sets may be generated for each audio portion, which may be a single audio bin or multiple audio bins (402). The audio portion may be analyzed to determine a vector of frequencies and amplitude. Audio feature sets may include vectors that represent the amplitude or energy for discrete frequencies, such as a Fourier transform of the audio portion. In some implementations, the amplitude is the energy of the audio portion for that frequency. In some implementations, the audio vector may be filtered, for example to remove low amplitude frequencies that may be considered noise in the audio portion.

In some implementations, the audio vector may be weighted to provide higher weights to frequencies that may correlate with objects in the video portion. For example, human hearing is more sensitive to certain frequencies, and in some implementations those frequencies may be weighted more heavily for determining synchronization between the audio component and the video component. Furthermore, in some implementations the audio vector may be filtered to remove noise.

One or more video feature sets may be generated for each video portion, which may be a single video frame or multiple video frames (404). Each video frame (including multiple video frames) may be provided to a model, for example a neural network or image embedding model, that outputs an object vector representing objects detected within the video frame(s). Another model or the same model may output an object attribute vector that includes features of the objects detected in the frame. Features may include, for example, position, location, and size. In some implementations, a model may accept the video frame and the object vector as inputs and output the object attribute vector. In some implementations the video frames may or may not be decoded when provided to the machine learning models to generate the object vector and object attribute vector.

The audio feature sets and the video feature sets are then used to determine correlations (406). In some implementations a pair comprising an audio feature set and a video feature set (which may include an object feature set and an object attribute feature set) are analyzed to determine the correlation. In some implementations the audio feature set and video feature set are provided to a machine learning model. The machine learning model may be trained on pairs of audio feature sets and video feature sets to determine a correlation between a an audio feature set and a video feature set. In some implementations, the correlation may be represented, for example, as a confidence score.

In some implementations, correlations are determined for pairs of a single audio portion and multiple video portions (or vice versa). For example, multiple correlations are determined for an audio bin and each video frame of a sequence of video frames. The correlations may indicate which of the video frames in the sequence best matches the audio bin. Similarly, a single video frame may be compared against each audio bin of a sequence of audio bins to determine a correlation for each pair.

The correlations may be used to determine the video component and audio component are out of sync as discussed above (408).

FIG. 5 presents a flow diagram illustrating an embodiment where correlations are determined between one or more video feature sets for a video portion and one or more predicted video feature sets generated from an audio portion. Video feature sets may be generated from a video portion (including a single video frame or multiple video frames) as described above (502). In some implementations, the video feature sets include an object feature set and an object attribute feature set. Predicted video feature sets may be generated based on an audio portion (504). In some implementations, the audio portion or the audio feature set may be used as inputs to a model to generate predicted video feature sets (504). In some implementations the audio portion used to generate the predicted video feature set is the audio portion corresponding to the video portion. In some implementations multiple predicted video feature sets may be generated, each from a different audio portion. The model used to generate the predicted video feature sets may be trained on pairs of audio feature sets and video feature sets to output a predicted video feature set given an audio feature set. The video feature set generated from a video portion and the predicted video feature set may be compared to determine a correlation (506). The correlations between pairs of video feature sets and predicted video feature sets may be used to determine the video component and audio component are desynchronized (508). It should be understood that while the correlation may be generated based on the video feature set for a video portion and a predicted video feature set, the correlation is also between the video portion and the corresponding audio portion used to generate the predicted video feature set.

FIG. 6 presents a flow diagram illustrating an embodiment where correlations are determined between audio feature sets for an audio portion and predicted audio feature sets generated from a video portion. Audio feature sets may be generated from an audio portion (including a single audio bin or multiple audio bins) as described above (602). In some implementations, the video frame and/or the video feature set may be used as an input to a model to generate predicted audio feature sets (604). The model may be trained on pairs of audio feature sets and video feature sets to output a predicted audio feature set given video feature sets. In some implementations the video portion used to generate the predicted audio feature set is the video portion corresponding to the audio portion used in 602. In some implementations multiple predicted audio feature sets may be generated, each from a different video portion. The audio feature set generated from an audio portion and the predicted audio feature set may be compared to determine a correlation (606). The correlations between pairs of audio feature sets and predicted audio feature sets may be used to determine the video component and audio component are desynchronized (608).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   receiving a media presentation, wherein the media presentation comprises a video component that includes a sequence of video frames, and an audio component that includes a sequence of audio bins, each audio bin corresponding to one of the video frames relative to a media timeline;
   generating a first audio vector based on a first audio bin of the sequence of audio bins, the first audio vector representing a plurality of features of the first audio bin;
   generating a first object vector based on a first video frame that corresponds to the first audio bin, wherein the first object vector represents one or more objects in the first video frame;
   generating a first object attribute vector that represents one or more features of the one or more objects represented by the first object vector;
   generating a first confidence score using a first machine learning model, the first audio vector, the first object vector, and the first object attribute vector, the first confidence score representing a measure of correlation between the first audio bin and the first video frame;
   generating a predicted object vector and a predicted object attribute vector using a second machine learning model and the first audio vector, the predicted object vector and the predicted object attribute vector representing a hypothetical video frame having a high degree of correlation with the first audio bin;
   generating a second confidence score that represents a measure of correlation between the predicted object vector and the predicted object attribute vector, and the first video frame; and
   determining, based on the first confidence score and the second confidence score, that the audio component and the video component are desynchronized; and modifying one or both of the audio component and the video component to improve synchronization of the audio and video components of the media presentation.

2. The method of claim 1, further comprising:
generating a second object vector and a second object attribute vector based on a second video frame, the second video frame being adjacent to the first video frame relative to the media timeline;
generating a second confidence score using the first machine learning model, the first audio vector, the second object vector, and the second object attribute vector, the second confidence score representing a measure of correlation between the first audio bin and the second video frame; and
determining the second confidence score is higher than the first confidence score; and
determining that the audio component and the video component are desynchronized based on the second confidence score being higher than the first confidence score.

3. The method of claim 1, further comprising determining a predicted audio vector using a third machine learning model, the first object vector, and the first object attribute vector, the predicted audio vector representing a hypothetical audio bin having a high degree of correlation with the first video frame;
generating a third confidence score that represents a measure of correlation between the predicted audio vector and the first audio bin; and
determining the audio component and the video component are desynchronized additionally based on the third confidence score.

4. A system, comprising one or more processors and memory configured to:
select a media presentation, the media presentation including a video component and an audio component that reference a media timeline;
generate a plurality of audio feature sets based on corresponding portions of the audio component;
generate a plurality of predicted video feature sets using a machine learning model and the plurality of audio feature sets, each predicted video feature set corresponding to a portion of the audio component;
generate a plurality of video feature sets based on corresponding portions of the video component, wherein each portion of the audio component corresponds to one of the portions of the video component relative to the media timeline;
determine, using the predicted video feature sets and the video feature sets, one or more correlations between one or more pairs of the portions of the audio component and the portions of the video components;
determine, using the one or more correlations, that the audio component and the video component are desynchronized, and
modify the media presentation to improve synchronization of the audio component and video component of the media presentation.

5. The system of claim 4, wherein each video feature set corresponds to a single video frame of the video component.

6. The system of claim 4, wherein the one or more processors and memory are further configured to generate a predicted audio feature set using a machine learning model and a first video feature set of the video feature sets, the predicted audio feature set representing hypothetical audio content having a high degree of correlation with a first portion of the video component corresponding to the first video feature set.

7. The system of claim 4, wherein the one or more processors and memory are further configured to determine that the audio component and the video component are desynchronized by providing the one or more correlations to a classifier trained on correlations between audio content and video content.

8. The system of claim 4, wherein the one or more correlations include a first set of correlations between a first portion of the video component and a subset of the portions of the audio component, wherein the one or more processors and memory are further configured to determine that the audio component and video component are desynchronized based on the first set of correlations.

9. The system of claim 4, wherein the one or more correlations include a second set of correlations between a first portion of the audio component and a subset of the portions of the video component, wherein the one or more processors and memory are further configured to determine that the audio component and video component are desynchronized based on the second set of correlations.

10. The system of claim 4, wherein the one or more processors and memory are further configured to modify the media presentation by advancing or delaying one or both of selected portions of the audio component and selected portions of the video component relative to the media timeline, inserting first audio content or first video content to the media presentation, removing second audio content or second video content from the media presentation, or any combination thereof, based on determining that the audio component and the video component are desynchronized.

11. A method, comprising:
selecting a media presentation, the media presentation including a video component and an audio component that reference a media timeline;
generating a plurality of audio feature sets based on corresponding portions of the audio component;
generate a plurality of predicted video feature sets using a machine learning model and the plurality of audio feature sets, each predicted video feature set corresponding to a portion of the audio component;
generating a plurality of video feature sets based on corresponding portions of the video component, wherein each portion of the audio component corresponds to one of the portions of the video component relative to the media timeline;
determining, using the predicted video feature sets and the video feature sets, one or more correlations between one or more pairs of the portions of the audio component and the portions of the video component;
determining, using the one or more correlations, that the audio component and the video component are desynchronized and
modifying the media presentation to improve synchronization of the audio component and video component of the media presentation.

12. The method of claim 11, wherein each video feature set corresponds to a single video frame of the video component.

13. The method of claim 11, further comprising generating a predicted audio feature set using a machine learning model and a first video feature set of the video feature sets, the predicted audio feature set representing hypothetical audio content having a high degree of correlation with a first portion of the video component corresponding to the first video feature set.

14. The method of claim 11, further comprising determining that the audio component and the video component are desynchronized by providing the one or more correlations to a classifier trained on correlations between audio content and video content.

15. The method of claim 11, wherein the one or more correlations include a first set of correlations between a first portion of the video component and a subset of the portions of the audio component, wherein the method further comprises determining that the audio component and video component are desynchronized based on the first set of correlations.

16. The method of claim 11, wherein the one or more correlations include a second set of correlations between a first portion of the audio component and a subset of the portions of the video component, wherein the method further comprises determining that the audio component and video component are desynchronized based on the second set of correlations.

17. The method of claim 11, further comprising modifying the media presentation by advancing or delaying one or both of selected portions of the audio component and selected portions of the video component relative to the media timeline, inserting first audio content or first video content to the media presentation, removing second audio content or second video content from the media presentation, or any combination thereof, based on determining that the audio component and the video component are desynchronized.

* * * * *